F. B. Carleton,
Horse Boots,
N° 60,687.   Patented Jan. 1, 1867.
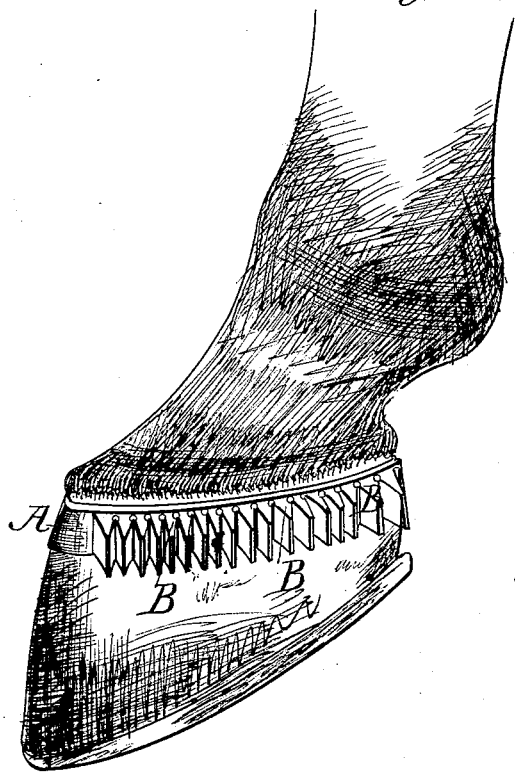
Fig: 1.
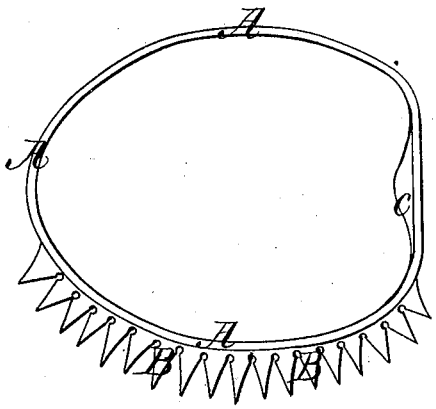
Fig: 2.
Witnesses;
Edward H. Knight
Solon C. Kemon
Inventor;
F. B. Carleton

United States Patent Office.

FRANKLIN B. CARLETON, OF CAMBRIDGE VERMONT.

Letters Patent No. 60,687, dated January 1, 1867.

---

ELASTIC HOOF PAD.

---

The Schedule referred to in these Letters Patent and making part of the same.

---

TO ALL WHOM IT MAY CONCERN:

Be it known that I, FRANKLIN B. CARLETON, of Cambridge, in the county of Lamoille, and State of Vermont, have invented a new improved Elastic Hoof Pad to prevent interfering; and I do hereby declare the following to be a full, clear, and exact description of the nature, construction, and operation of the same, sufficient to enable others skilled in the art to which my invention appertains to make and use the same, reference being had to the accompanying drawings, which are made part of this specification, and in which—

Figure 1 is a perspective view.

Figure 2 is a horizontal section.

The strap embracing the hoof is provided with pliable projections which impinge upon the other leg or foot, and prevent interfering.

In the drawings, A is a band, preferably of elastic material; and B B are protruding portions of an elastic material. I prefer to make the band A and the portion B B of a solid piece of India rubber, and the band of such a circumference that it may embrace the hoof with sufficient tightness to keep itself in position. The band may be made wholly or in part of leather, and the portions B B firmly attached thereto, the leather being buckled; but I prefer to have all the device, as I have said, of elastic material, so that it may be self-fastening and self-sustaining. The enlargement C occupies the depression in the heel, and prevents the shifting, circularly, of the band. The crown of the foot above the hoof projects somewhat beyond the line of the wall of the hoof, and is the means of keeping the band from slipping upwardly. When made of India rubber, as I prefer to have it, it is proof against wet, wear, and warmth, and maintains its position by its own elasticity. It is readily attached or detached, as occasion may require, and when used on young horses will teach them to travel "wide," so as not to require the attachment after awhile. In all cases where an attachment to prevent interference is fastened to the leg, or to the foot above the hoof, it will chafe and gall eventually. As water runs in or perspiration accumulates and grit collects, the part will become chafed by contact with the band or pad, and it can only be maintained in position by such close attachment that circulation is impeded, the limb being "corded" by the fastening. This is palpably cruel and injurious, and by way of avoiding it clumsy and unsightly boots have been invented, but have met with little favor. My device is attached to the hoof alone, and is not open to the objections above stated. As the foot having my pad attached approaches the other leg or foot it is fended off slightly by the contact of the projections B, and so gently as not to chafe or irritate the part thus struck, while the interfering of the shoe with the leg or foot is effectually prevented. For different sizes of hoof the bands will be made of different lengths. If necessary, or it be desired to make it keep a lower position, it may be tacked to the hoof in the position desired, or a secondary strap or loop, passing downward and between the hoof and the shoe, may unite the band A at points on the inner and outer sides of the hoof respectively.

The device is adapted for either foot by simply turning it over to bring the frill inside. The same band will answer for either the fore or hind feet.

Having described my invention, what I claim therein as new, and desire to secure by Letters Patent, is—

As a new article of manufacture, an elastic hoof pad, constructed substantially as described and represented.

F. B. CARLETON.

Witnesses:
EDWARD H. KNIGHT,
SOLON C. KEMON.